United States Patent
Ozawa et al.

(10) Patent No.: US 8,748,509 B2
(45) Date of Patent: Jun. 10, 2014

(54) FRICTION MATERIAL AND RESIN COMPOSITION FOR FRICTION MATERIAL

(75) Inventors: Hideki Ozawa, Chiba (JP); Mitsushi Taguchi, Chiba (JP)

(73) Assignee: Ube Industries, Ltd., Yamaguchi (JP)

( * ) Notice: Subject to any disclaimer, the term of this patent is extended or adjusted under 35 U.S.C. 154(b) by 152 days.

(21) Appl. No.: 12/935,702

(22) PCT Filed: Mar. 27, 2009

(86) PCT No.: PCT/JP2009/056255
§ 371 (c)(1),
(2), (4) Date: Sep. 30, 2010

(87) PCT Pub. No.: WO2009/123042
PCT Pub. Date: Oct. 8, 2009

(65) Prior Publication Data
US 2011/0028595 A1  Feb. 3, 2011

(30) Foreign Application Priority Data

Mar. 31, 2008 (JP) .................................. 2008-092252

(51) Int. Cl.
*C08J 5/14* (2006.01)
(52) U.S. Cl.
USPC ......................................... 523/149; 528/363
(58) Field of Classification Search
USPC ......................................... 523/149; 528/363
See application file for complete search history.

(56) References Cited

U.S. PATENT DOCUMENTS

| | | |
|---|---|---|
| 4,107,125 A | 8/1978 | Lovejoy |
| 4,142,870 A | 3/1979 | Lovejoy |
| 5,260,412 A * | 11/1993 | Yamamoto et al. ............ 528/353 |
| 5,708,128 A | 1/1998 | Oikawa et al. |
| 6,281,323 B1 * | 8/2001 | Yokota et al. ................. 528/170 |
| 2010/0178501 A1 | 7/2010 | Masuko et al. |

FOREIGN PATENT DOCUMENTS

| | | |
|---|---|---|
| EP | 978529 A1 * | 2/2000 |
| EP | 1018507 | 7/2000 |
| JP | 53-5251 | 1/1978 |
| JP | 61-136027 | 6/1986 |
| JP | 5-106707 | 4/1993 |
| JP | 5-168259 | 7/1993 |
| JP | 6-240233 | 8/1994 |
| JP | 8-109937 | 4/1996 |
| JP | 9-071651 | 3/1997 |
| JP | 10-060414 | 3/1998 |
| JP | 2000-129001 | 5/2000 |
| JP | 2000-219741 | 8/2000 |
| JP | 2001-240847 | 9/2001 |
| JP | 2002-173667 | 6/2002 |
| JP | 2003-292728 | 10/2003 |
| JP | 2005-082626 | 3/2005 |
| WO | 8101375 | 5/1981 |
| WO | 2007083810 | 7/2007 |

OTHER PUBLICATIONS

Machine Translation of JP 08-109937.*
Partial Human Translation of Table 1 of JP 08-109937.*
Extended European Search Report dated Oct. 15, 2013; Application No. 09727559.8.
International Search Report, PCT/JP2009/056255, Apr. 21, 2009.

* cited by examiner

*Primary Examiner* — Mark Eashoo
*Assistant Examiner* — Chelsea M Lowe
(74) *Attorney, Agent, or Firm* — Young & Thompson

(57) ABSTRACT

A friction material characterized by using a resin composition for friction materials, the resin composition containing, as a binder, an aromatic imide oligomer having an addition-reactive group at an end thereof. Also described is a resin composition for friction materials, containing: a powder of an aromatic imide oligomer having an addition-reactive group at an end thereof; at least one type of fiber selected from the group consisting of carbon fiber, aramid fiber, glass fiber, ceramic fiber, and metal fiber; and an inorganic filler. The friction material and a resin composition for friction materials have good formability and in which the binder itself has excellent heat resistance and mechanical properties, compared to a friction material using a phenolic resin as a binder.

18 Claims, No Drawings

FRICTION MATERIAL AND RESIN COMPOSITION FOR FRICTION MATERIAL

TECHNICAL FIELD

The present invention relates to a friction material and a resin composition for friction materials, and particularly to a friction material and a resin composition for friction materials having excellent heat resistance and mechanical strength and also good formability.

BACKGROUND ART

Friction materials are used in various applications, such as brake pads, brake linings, clutch facings, and brake shoes of automobiles, industrial vehicles, railcars, airplanes, etc. Resin compositions generally used for making these friction materials are produced by employing a phenolic resin as a binder and blending together the phenolic resin, fibers such as glass fiber, aramid fiber, or metal fiber, and an inorganic filler such as calcium carbonate or barium sulfate.

Patent Literature 1 discloses a phenolic resin composition preferably usable for friction materials etc. The cured molded product made from this composition has good heat resistance despite the fact that it is made of a phenolic resin composition, but its flexural strength after applying thermal history at 350° C. for 8 hours, drops to 43% with respect to its normal-state flexural strength (see Example 1). In recent years, further improved properties are being demanded of friction materials so that they can be used in severer conditions.

Patent Literatures 2 and 3 disclose the disadvantages of using, in friction materials, flame retardants such as antimony compounds and reinforcement materials such as asbestos fibers, which have been employed for improving heat resistance and flame resistance of friction materials.

Accordingly, there has been a demand for friction materials and resin compositions for friction materials in which the binder itself has further improved heat resistance and mechanical properties.

Patent Literature 4 discloses the possibility of using, as linings etc. of brakes and clutches, a filled article made using a mixture of particles of a high-molecular-weight linear aromatic polyimide containing a ketonic carbonyl group and particles of a low-molecular-weight linear aromatic polyimide having an amine end group. The article, however, is not preferable in terms that molding is complex and requires severe conditions, such as a compression process under a pressure of 35 MPa at around 400 to 420° C. or under a pressure of 690 MPa at room temperature, and heat treatment at 400° C. for about 3 hours followed by heating at around 425 to 435° C. for 1 hour.

Patent Literature 5 discloses an aromatic imide oligomer having an addition-reactive group at an end thereof. The document discloses a method of producing a fiber composite material using a solution of the aromatic imide oligomer. However, the document is completely silent about using the oligomer for a friction material.

Patent Literature 1: JP 2003-292728 A
Patent Literature 2: JP 2002-173667 A
Patent Literature 3: JP 2001-240847 A
Patent Literature 4: JP 61-36010 B
Patent Literature 5: JP 2000-219741 A

DISCLOSURE OF INVENTION

An object of the present invention is to provide a friction material and a resin composition for friction materials having good formability and in which the binder itself has excellent heat resistance and mechanical properties, compared to a friction material using a phenolic resin as a binder.

The present invention relates to the following items:

1. A friction material characterized by using a resin composition for friction materials, the resin composition containing an aromatic imide oligomer having an addition-reactive group at an end thereof.
2. The friction material according to Item 1, wherein the addition-reactive group is a reactive group selected from the group consisting of a phenylethynyl group, an acetylene group, a nadic group, and a maleimide group.
3. The friction material according to Item 1 or 2, wherein a tetracarboxylic acid component for producing the aromatic imide oligomer includes at least one tetracarboxylic acid dianhydride selected from the group consisting of 2,3,3',4'-biphenyltetracarboxylic acid dianhydride, 2,2'3,3'-biphenyltetracarboxylic acid dianhydride, 3,3',4,4'-biphenyltetracarboxylic acid dianhydride, and 3,3',4,4'-benzophenone tetracarboxylic acid dianhydride.
4. The friction material according to any one of Items 1 to 3, wherein a diamine component for producing the aromatic imide oligomer includes at least two aromatic diamines (a diamine mixture) selected from the group consisting of 1,3-diaminobenzene, 1,3-bis(4-aminophenoxy)benzene, 3,4'-diaminodiphenyl ether, 4,4'-diaminodiphenyl ether, and 2,2'-bis(trifluoromethyl)benzidine.
5. The friction material according to any one of Items 1 to 4, wherein the repeating number (average) of repeating units of the aromatic imide oligomer is from 0.5 to 20.
6. The friction material according to any one of Items 1 to 5, wherein the aromatic imide oligomer is represented by the following chemical formula (1):

[Chem. 1]

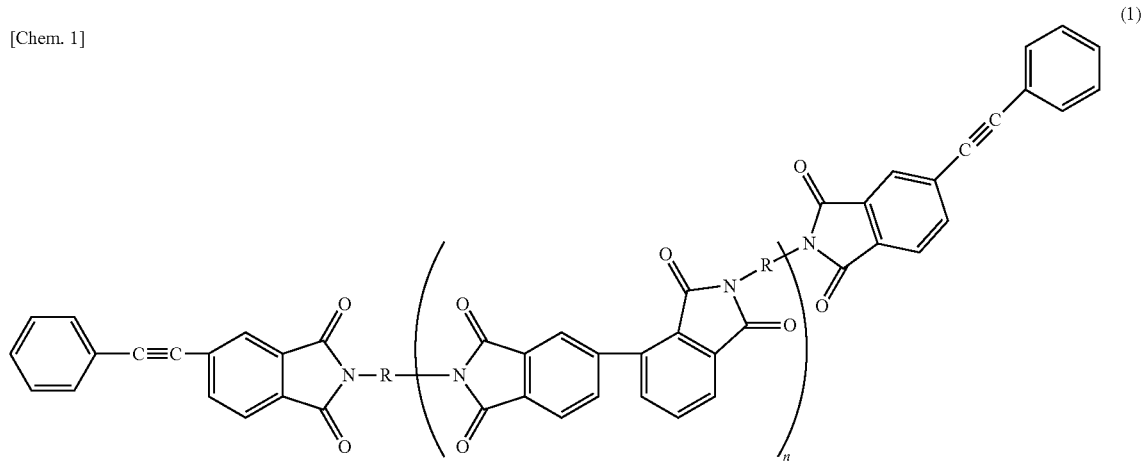

wherein R represents an aromatic diamine residue, and n is an integer of 0 to 20.

7. A resin composition for friction materials, containing:
a powder of an aromatic imide oligomer having an addition-reactive group at an end thereof;
at least one type of fiber selected from the group consisting of carbon fiber, aramid fiber, glass fiber, ceramic fiber, and metal fiber; and
an inorganic filler.

BEST MODE FOR CARRYING OUT INVENTION

The friction material of the present invention is characterized by using a resin composition for friction materials (referred to hereinafter as "friction-material resin composition") that contains, as a binder, an aromatic imide oligomer having an addition-reactive group at an end thereof (referred to hereinafter as "aromatic imide oligomer having an addition-reactive end group").

The aromatic imide oligomer having an addition-reactive end group can be produced easily by using an aromatic tetracarboxylic acid dianhydride, an aromatic diamine, and a "compound having in its molecule an addition-reactive group and also an anhydride group or an amino group", in such amounts that the total equivalent of the acid groups is substantially equal to the total amount of amino groups; and reacting the components preferably in a solvent. As for the reaction, it is preferable to employ a two-step method of: polymerizing the components at a temperature of 100° C. or below, and more preferably 80° C. or below, for preferably 0.1 to 50 hours, to form an oligomer having an amide-acid bond; and adding an imidization agent thereto to cause chemical imidization, or heating the amide-acid oligomer at higher temperatures of around 140 to 270° C. to cause thermal imidization. It is also preferable to employ a single-step method of allowing the components to react at high temperatures of 140 to 270° C. from the beginning for preferably 0.1 to 50 hours to cause both polymerization and imidization.

There is no limitation to the type of solvent to be used for the reaction, but organic polar solvents, such as N-methyl-2-pyrrolidone, N,N-dimethylformamide, N,N-dimethylacetamide, N,N-diethylacetamide, γ-butyllactone, and N-methylcaprolactam, are preferable because of their excellent dissolubility.

By mixing a non-solvent having low dissolubility, such as water, alcohol, or hexane, to the thus-prepared reaction solution of the aromatic imide oligomer having an addition-reactive end group, the aromatic imide oligomer having an addition-reactive end group can preferably be precipitated as a powder. The powder can easily be separated from the solvent by such means as filtering. By allowing the powder to dry at temperatures equal to or below the temperature at which the addition-reactive end group reacts—e.g. at 100° C. or below, more preferably at 80° C. or below, and even more preferably at room temperature (around 25° C.)—under reduced pressure if necessary, it is possible to preferably prepare a powder of the aromatic imide oligomer having an addition-reactive end group.

In the present invention, the addition-reactive group at the end of the aromatic imide oligomer is not particularly limited as long as it undergoes curing reaction (addition polymerization reaction) by being heated at the time of manufacturing friction materials from the present friction-material resin composition. However, from the standpoint of allowing preferable curing reaction at the time of manufacturing friction materials and the standpoint of providing good heat resistance to the cured products obtained, the addition-reactive group is preferably a reactive group selected from the group consisting of a phenylethynyl group, an acetylene group, a nadic group, and a maleimide group, and is more preferably either a phenylethynyl group or an acetylene group, and is even more preferably a phenylethynyl group.

A phenylethynyl group is preferable in terms that no gas component is emitted due to curing reaction and that the obtained cured product exhibits excellent heat resistance and also good mechanical strength such as excellent elongation-at-break.

The addition-reactive group is introduced to the end of the aromatic imide oligomer by reacting the "compound having in its molecule an addition-reactive group and also an anhydride group or an amino group" with an amino group or an acid anhydride group at the end of the aromatic imide oligomer, to preferably form an imide ring.

Preferable examples of the "compound having in its molecule an addition-reactive group and also an anhydride group or an amino group" may include 4-(2-phenylethynyl)phthalic anhydride, 4-(2-phenylethynyl)aniline, 4-ethynyl-phthalic anhydride, 4-ethynylaniline, nadic anhydride, and maleic anhydride.

Examples of preferably-usable tetracarboxylic acid components for forming the aromatic imide oligomer having an addition-reactive end group include at least one tetracarboxylic acid dianhydride selected from the group consisting of 2,3,3',4'-biphenyltetracarboxylic acid dianhydride, 2,2',3,3'-biphenyltetracarboxylic acid dianhydride, 3,3',4,4'-biphenyltetracarboxylic acid dianhydride, and 3,3',4,4'-benzophenone tetracarboxylic acid dianhydride; more preferably 2,3,3',4'-biphenyltetracarboxylic acid dianhydride. The exemplified tetracarboxylic acid components are preferable because the obtained aromatic imide oligomer having an addition-reactive end group tends to have a low melting point and also tends to have a low melt viscosity. Further, the obtained cured product will have excellent heat resistance and mechanical properties.

Preferable examples of the diamine component for forming the aromatic imide oligomer having an addition-reactive end group include, although not limited to: diamines having one benzene ring, such as 1,4-diaminobenzene, 1,3-diaminobenzene, 1,2-diaminobenzene, 2,6-diethyl-1,3-diaminobenzene, 4,6-diethyl-2-methyl-1,3-diaminobenzene, 3,5-diethyltoluene-2,4-diamine, and 3,5-diethyltoluene-2,6-diamine; diamines having two benzene rings, such as 4,4'-diaminodiphenyl ether, 3,4'-diaminodiphenyl ether, 3,3'-diaminodiphenyl ether, 3,3'-diaminobenzophenone, 4,4'-diaminobenzophenone, 4,4'-diaminodiphenylmethane, 3,3'-diaminodiphenylmethane, bis(2,6-diethyl-4-aminophenoxy) methane, bis(2-ethyl-6-methyl-4-aminophenyl)methane, 4,4'-methylene-bis(2,6-diethylaniline), 4,4'-methylene-bis(2-ethyl, 6-methylaniline), 2,2-bis(3-aminophenyl)propane, 2,2-bis(4-aminophenyl)propane, benzidine, 2,2'-bis(trifluoromethyl)benzidine, 3,3'-dimethylbenzidine, 2,2-bis(4-aminophenyl)propane; and 2,2-bis(3-aminophenyl)propane; diamines having three benzene rings, such as 1,3-bis(4-aminophenoxy)benzene, 1,3-bis(3-aminophenoxy)benzene, 1,4-bis(4-aminophenoxy)benzene, and 1,4-bis(3-aminophenoxy)benzene; and diamines having four benzene rings, such as 2,2-bis[4-[4-aminophenoxy]phenyl]propane and 2,2-bis[4-[4-aminophenoxy]phenyl]hexafluoropropane. The diamine component may preferably be used singly, or several types may be used mixed.

Among the above diamine components, it is preferable to use a diamine mixture composed of at least two aromatic diamines selected from the group consisting of 1,3-diaminobenzene, 1,3-bis(4-aminophenoxy)benzene, 3,4'-diaminodiphenyl ether, 4,4'-diaminodiphenyl ether, and 2,2'-bis(trifluoromethyl)benzidine. Particularly, from the standpoint of both heat resistance and formability, it is preferable to use: a diamine mixture combinedly using 1,3-diaminobenzene and 1,3-bis(4-aminophenoxy)benzene; a diamine mixture combinedly using 3,4'-diaminodiphenyl ether and 4,4'-diaminodiphenyl ether; a diamine mixture combinedly using 3,4'-diaminodiphenyl ether and 1,3-bis(4-aminophenoxy)benzene; a diamine mixture combinedly using 4,4'-diaminodiphenyl ether and 1,3-bis(4-aminophenoxy)benzene; or a diamine mixture combinedly using 2,2'-bis(trifluoromethyl)benzidine and 1,3-bis(4-aminophenoxy)benzene.

In the aromatic imide oligomer having an addition-reactive end group used in the present invention, the repeating number of repeating units of the imide oligomer (which corresponds to "n" in the chemical formula (1) shown above) is 0 to 20, preferably 0 to 15, more preferably 0 to 10, and particularly preferably around 1 to 5, and the number-average molecular weight in terms of styrene as measured using GPC is preferably 10000 or less, more preferably 5000 or less, and even more preferably 3000 or less. The repeating units are not obtained as a single type of compound, but are obtained as a mixture of compounds ranging within a certain area of distribution depending on the production method. In the present invention, the repeating number of the repeating units of the aromatic imide oligomer having an addition-reactive end group is, in average, preferably 0.5 to 20, more preferably 0.5 to 15, even more preferably 0.5 to 10, and particularly preferably 0.5 to 5.

It is extremely important, in terms of formability of the friction-material resin composition, to adjust the repeating number of the repeating units to fall within the above-described range, because there is a direct influence on the melting temperature and melt viscosity of the aromatic imide oligomer having an addition-reactive end group. More specifically, a larger repeating number of repeating units will raise the melting temperature of the aromatic imide oligomer having an addition-reactive end group, or raise the melt viscosity even in cases where the melting temperature is kept low. In the present friction-material resin composition composed mainly of resin powder, fibers, and an inorganic filler, a higher melting temperature or higher melt viscosity will hinder uniform dispersion and preferable reaction of the resin powder with the fibers and the inorganic filler. This, in turn, may make it impossible to mold the resin composition at low temperatures or may deteriorate the properties of the obtained friction material, such as heat resistance and mechanical strength, which is not preferable.

Note that the repeating number of the repeating units can easily be adjusted by changing the proportions of the aromatic tetracarboxylic acid dianhydride, the aromatic diamine, and the "compound having in its molecule an addition-reactive group and also an anhydride group or an amino group". More specifically, because the "compound having in its molecule an addition-reactive group and also an anhydride group or an amino group" constitutes the end group (end-cap) of the aromatic imide oligomer to be produced, increasing the proportion of this "compound" will reduce the repeating number of repeating units and thus the molecular weight. On the other hand, decreasing the proportion of this "compound" will increase the repeating number of repeating units and thus the molecular weight.

The aromatic imide oligomer having an addition-reactive end group used in the present invention may be represented particularly preferably by, although not limited to, the following chemical formula (1):

[Chem. 2]

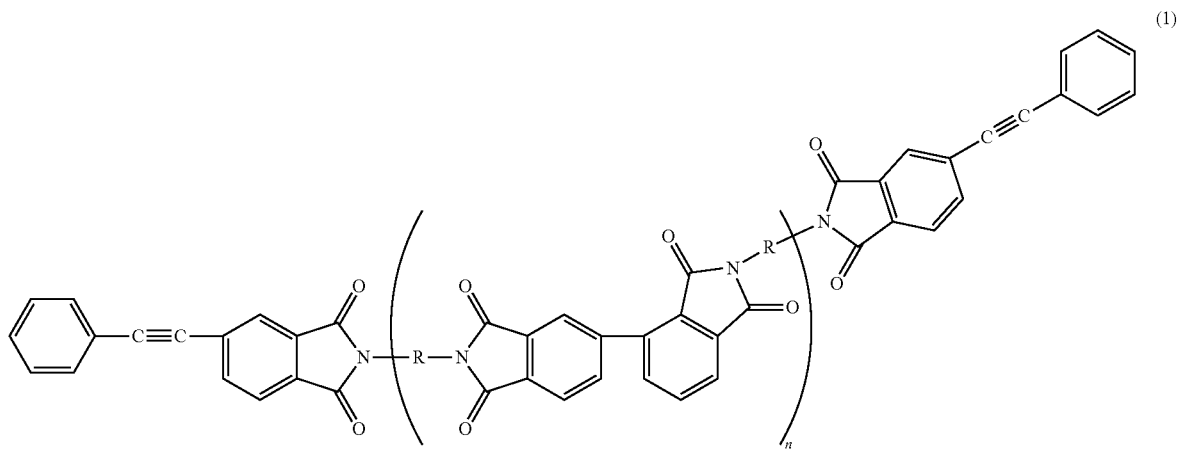

(1)

In the formula, R represents an aromatic diamine residue, and preferably represents either: aromatic diamine residues consisting of a combination of 1,3-diaminobenzene and 1,3-bis(4-aminophenoxy)benzene; aromatic diamine residues consisting of a combination of 2,2'-bis(trifluoromethyl)benzidine and 1,3-bis(4-aminophenoxy)benzene; aromatic diamine residues consisting of a combination of 3,4'-diaminodiphenyl ether and 1,3-bis(4-aminophenoxy)benzene; aromatic diamine residues consisting of a combination of 3,4'-diaminodiphenyl ether and 4,4'-diaminodiphenyl ether; or aromatic diamine residues consisting of a combination of 4,4'-diaminodiphenyl ether and 1,3-bis(4-aminophenoxy)benzene.

Further, "n" represents an integer of 0 to 20; the minimum value of "n" is preferably 1, and the maximum value of "n" is preferably 15, more preferably 10, and even more preferably 5.

In cases where "n" exceeds 20, the formability of the resin composition may deteriorate or the properties of the obtained friction material may be impaired, which is not preferable.

The friction-material resin composition of the present invention preferably contains, along with a powder of the aromatic imide oligomer having an addition-reactive end group serving as a binder: at least one type of fiber selected from the group consisting of carbon fiber, aramid fiber such as aramid pulp (e.g. "Kevlar" available from DuPont), glass fiber, ceramic fiber such as potassium titanate or rock wool, and metal fiber such as steel fiber, copper fiber, or brass fiber; and an inorganic filler.

Examples of the inorganic filler may preferably include, but are not limited to, calcium carbonate, barium sulfate, calcium hydroxide, aluminum powder, copper powder, graphite, molybdenum disulfide, cashew dust, rubber dust, mica, and vermiculite.

The amount of powder of the aromatic imide oligomer having an addition-reactive end group used with respect to the total amount of the friction-material resin composition is preferably 3 to 40% by mass, and more preferably 5 to 30% by mass. The amount of fiber used with respect to the total amount of the friction-material resin composition is preferably 3 to 50% by mass, and more preferably 5 to 40% by mass. The amount of inorganic filler used with respect to the total amount of the friction-material resin composition is preferably 5 to 90% by mass, and more preferably 30 to 80% by mass.

The friction-material resin composition of the present invention may also preferably include a flame retardant or other additives.

The friction-material resin composition of the present invention is a composition containing a powder of an aromatic imide oligomer having an addition-reactive group, a fiber, an inorganic filler, and other components. At the time of molding, the resin composition is heated to melt the powder of the aromatic imide oligomer having an addition-reactive group and to then impregnate the fiber and the inorganic filler with the molten oligomer. The present invention can lower the melting temperature during this molding process. This is because the melting temperature of the aromatic imide oligomer having an addition-reactive group is low, and also the aromatic imide oligomer having an addition-reactive group has a lower molten-state viscosity compared to polymers. Furthermore, the melting temperature during molding can be kept sufficiently lower than the reaction temperature of the addition-reactive group in the aromatic imide oligomer, and therefore, the curing reaction can be suppressed from occurring at the melting temperature during molding, which leads to good stability in viscosity. Due to these factors, the fiber and the inorganic filler can be impregnated easily and uniformly with the aromatic imide oligomer having an addition-reactive group.

After impregnating the fiber and the inorganic filler uniformly with the aromatic imide oligomer having an addition-reactive group as described above, the resin composition is heated up to a curing temperature, which is higher than the melting temperature, and in this way, a friction material can easily be produced as a cured molded product.

More specifically, a pressure range of 1 to 30 MPa, more preferably 5 to 20 MPa, and a temperature range of 250 to 400° C., more preferably 270 to 380° C., are preferably employed as the molding conditions in producing a friction material, as a cured molded product, using the friction-material resin composition of the present invention. The friction material can easily be produced as a cured molded product by applying heat in the above temperature range for around 0.1 to 6 hours, more preferably 0.5 to 3 hours, while applying pressure in the above pressure range, to melt the powder of the aromatic imide oligomer having an addition-reactive end group and also to allow the addition-reactive end group to undergo a curing (addition polymerization) reaction.

More specifically, the friction-material resin composition of the present invention can be used to easily produce a friction material as a cured molded product through the following steps:

(1) The friction-material resin composition is filled into a mold. The mold is set to a hot pressing machine heated to a temperature within a range from 250 to 300° C., and the mold is heated, without applying pressure, for 5 to 30 minutes until the mold reaches a temperature ranging from 250 to 300° C. (i.e., the mold and the friction-material resin composition therein are heated so that their temperatures become uniform in the temperature range of 250 to 300° C.).

(2) After being heated to the above temperature range, the mold is pressurized for 10 minutes under pressure within a range from 1 to 30 MPa. In this step, the fiber and the inorganic filler are impregnated uniformly with the aromatic imide oligomer.

(3) The temperature is raised (at a rate of 0.5 to 5° C./minute) up to a temperature range of 300 to 400° C., while maintaining the pressurized state within the above pressure range of 1 to 30 MPa.

(4) After entering the temperature range of 300 to 400° C., the mold is heated and pressurized for 0.5 to 3 hours at a temperature within the temperature range of 300 to 400° C., while maintaining the pressurized state within the above pressure range of 1 to 30 MPa. The curing reaction occurs in this step.

(5) The mold is cooled (at a rate of 0.5 to 5° C./minute) down to a temperature range of 200 to 300° C., while maintaining the pressurized state within the above pressure range of 1 to 30 MPa. If the pressurized state is not maintained in this step, the cured molded product may suffer from blisters and/or deformation, which is not preferable.

(6) The pressure is released after cooling down to the temperature range of 200 to 300° C. The mold is removed from the hot pressing machine and left to cool down to room temperature, to thus obtain a cured molded product (friction material).

The preferable conditions for molding a cured molded product using the friction-material resin composition of the present invention are extremely mild compared to the molding conditions using a conventional aromatic polyimide powder disclosed for example in Patent Literature 4, such as a straight-chain polyimide powder ("Vespel SP", a product available from DuPont)—i.e., molding conditions that require heating at temperatures of 400° C. or above under high pressures of around 100 MPa.

Such mild molding conditions of the present invention are realized thanks to the remarkably low melting temperature (glass transition temperature or softening point) of the aromatic imide oligomer itself achieved by adjusting the repeating number of the repeating units of the aromatic imide oligomer having an addition-reactive end group, which constitutes the friction-material resin composition, preferably to 20 or less. That is, by setting the melting temperature of the aromatic imide oligomer itself e.g. 50° C. or more below the reaction temperature of the addition-reactive end group, the fiber and the inorganic filler can be impregnated with the aromatic imide oligomer easily and uniformly at a temperature between the melting temperature and the reaction temperature in a stable manner at low viscosity, without giving rise to an increase in viscosity due to reaction of the addition-reactive groups. Subsequent heating of the friction-material resin composition up to a temperature higher than the reaction temperature of the addition-reactive end group will allow a friction material to be produced in a preferable manner as the cured molded product.

Note that the melting temperature of the aromatic imide oligomer itself and the reaction temperature of the addition-reactive end group can be observed respectively as an endothermic peak and an exothermic peak using differential scanning calorimetry (DSC) by raising the temperature at a rate of 20° C./minute, for example.

Assuming that the measured peak values are respectively the melting temperature of the aromatic imide oligomer itself and the reaction temperature of the addition-reactive group, it is preferable to adjust the difference between the two temperatures to 50° C. or more, more preferably 100° C. or more, and even more preferably 150° C. or more. A preferable method for molding a friction material using the friction-material resin composition of the present invention may preferably include the following steps:

(1) a step of heating and pressurizing the friction-material resin composition within a temperature range between the melting temperature of the aromatic imide oligomer itself and the reaction temperature of the addition-reactive group; and (2) a step of heating and pressurizing the resin composition within a temperature range from 30° C. below to 30° C. above the reaction temperature of the addition-reactive group.

In addition to the excellent formability described above, the friction material of the present invention has excellent heat resistance and mechanical strength. For example, the friction material can maintain a flexural strength of around 80% or above at a high temperature of 250° C. with respect to the flexural strength at 23° C., and can even maintain a flexural strength of around 70% or above at an even-higher temperature of 300° C. with respect to the flexural strength at 23° C. Further, there is substantially no change in strength after applying thermal history for 8 hours at 350° C., compared to the strength before applying thermal history.

EXAMPLES

The present invention will be described in further detail below according to Examples thereof. Note, however, that the present invention is not limited to the following Examples.

Reference Example 1

Producing Powder of Aromatic Imide Oligomer having Addition-Reactive End Group

In a reactor equipped with a stirrer, a reflux condenser, and a thermometer were placed 374 g (1.28 mol) of 1,3-bis(4-aminophenoxy)benzene, 138 g (1.28 mol) of m-phenylenediamine, 399 g (1.36 mol) of 2,3,3',4'-biphenyltetracarboxylic acid dianhydride, 595 g (2.4 mol) of 4-(2-phenylethynyl) phthalic anhydride, and 3207 g of N-methyl-2-pyrrolidone. The mixture was heated and stirred at 180° C. for 12 hours, allowing the mixture to react while removing water therefrom. After completing the reaction, water was added to the reaction solution, to allow the imide oligomer to precipitate. The precipitate was washed thoroughly with water and was then dried sufficiently using a conical dryer, to obtain a powder of an aromatic imide oligomer having an addition-reactive end group.

The average repeating number ("n" in the chemical formula (1)) of repeating units of the powder of aromatic imide oligomer having an addition-reactive end group was 1.13.

The powder of the aromatic imide oligomer having an addition-reactive end group was subjected to DSC; the observed melting temperature of the aromatic imide oligomer itself was 180° C., and the reaction temperature of the addition-reactive group was 370° C. The melt viscosity at 280° C. was 1 to 15 poise (dynamic viscoelastic measurement), which is extremely low, and this melt viscosity at 280° C. was stable and hardly changed for 3 hours. The curing reaction required no catalyst etc., and substantially finished in about 1 hour within a temperature range of 350° C. to 400° C. without emitting any gas accompanying the reaction.

In the Examples below, the following fibers and fillers were used:

Barium sulfate: Average particle size of 20 μm
Calcium carbonate: Average particle size of 20 μm
Aramid fiber: thy-pulp fiber length of 2 mm In the Examples below, the friction material was evaluated as follows.

The flexural strength of the obtained friction material was measured according to JIS K7203 using a universal tester. The measurement was conducted in measurement-temperature atmospheres of 23° C., 250° C., and 300° C. Further, the friction material was exposed to a temperature of 350° C. in an oven, removed from the oven, and then subjected to a flexural test at a measurement temperature of 23° C.

Example 1

In a V-shape mixer, 15% by mass of the powder of the aromatic imide oligomer having an addition-reactive end group as produced in Reference Example 1, 40% by mass of calcium carbonate, 40% by mass of barium sulfate, and 5% by mass of aramid fiber were mixed for 10 minutes.

The obtained mixture was filled in a mold made of a stainless steel (SUS) plate and a spacer, and was subjected to preliminary molding by being pressurized at 280° C., 20 MPa for 10 minutes. The temperature was raised while maintaining the pressure, and the mixture was hot-pressed at 370° C., 20 MPa for 1 hour. The mixture was then cooled to 250° C. while maintaining the pressure, to obtain a uniform friction material.

Evaluation results for this friction material are shown in Table 1.

The decrease in the friction material's weight during heating was also measured using a thermogravimeter. The friction material merely exhibited a weight loss of 0.1% by mass or less during 4 hours of exposure in the atmosphere at 350° C., and a weight loss of 0.2% by mass or less during 8 hours of exposure in the atmosphere at 350° C.

Example 2

In a V-shape mixer, 20% by mass of the powder of the aromatic imide oligomer having an addition-reactive end group as produced in Reference Example 1, 37.5% by mass of calcium carbonate, 37.5% by mass of barium sulfate, and 5% by mass of aramid fiber were mixed for 10 minutes.

The obtained mixture was filled in a mold, and was subjected to preliminary molding by being pressurized at 280° C., 5 MPa for 10 minutes. The temperature was raised while maintaining the pressure, and the mixture was hot-pressed at 370° C., 5 MPa for 1 hour. The mixture was then cooled to 250° C. while maintaining the pressure, to obtain a uniform friction material.

Evaluation results for this friction material are shown in Table 1.

Example 3

In a V-shape mixer, 14% by mass of the powder of the aromatic imide oligomer having an addition-reactive end group as produced in Reference Example 1, 38% by mass of calcium carbonate, 38% by mass of barium sulfate, and 10% by mass of aramid fiber were mixed for 10 minutes.

The obtained mixture was filled in a mold, and was subjected to preliminary molding by being pressurized at 280° C., 20 MPa for 10 minutes. The temperature was raised while maintaining the pressure, and the mixture was hot-pressed at 370° C., 20 MPa for 1 hour. The mixture was then cooled to 250° C. while maintaining the pressure, to obtain a uniform friction material.

Evaluation results for this friction material are shown in Table 1.

TABLE 1

| | Unit | Example 1 | Example 2 | Example 3 |
|---|---|---|---|---|
| Formulation of friction-material resin composition | | | | |
| Aromatic imide oligomer powder (Ref. Ex. 1) | wt % | 15 | 20 | 14 |
| Calcium carbonate | wt % | 40 | 37.5 | 38 |
| Barium sulfate | wt % | 40 | 37.5 | 38 |
| Aramid fiber | wt % | 5 | 5 | 10 |
| Conditions for forming friction material | | | | |
| Maximum heating temperature | ° C. | 370 | 370 | 370 |
| Molding time | hour | 1 | 1 | 1 |
| Molding pressure | MPa | 20 | 5 | 20 |
| Properties of friction material | | | | |
| Flexural strength | | | | |
| (Measurement temp.: 23° C.) | MPa | 71 | 73 | 69 |
| (Measurement temp.: 250° C.) | MPa | 64 | 59 | 62 |
| (Measurement temp.: 300° C.) | MPa | 49 | 54 | 50 |
| Flexural modulus | | | | |
| (Measurement temp.: 23° C.) | GPa | 21 | 16 | 20 |
| (Measurement temp.: 250° C.) | GPa | 15 | 11 | 13 |
| (Measurement temp.: 300° C.) | GPa | 9 | 9 | 9 |
| Properties of friction material after thermal history (at 350° C. for 8 hours) | | | | |
| Flexural strength | | | | |
| (Measurement temp.: 23° C.) | MPa | 74 | 75 | 72 |
| Flexural modulus | | | | |
| (Measurement temp.: 23° C.) | GPa | 19 | 17 | 17 |

The friction materials obtained in Examples 1 to 3 maintained a flexural strength of around 80% or above at a high temperature of 250° C. with respect to the flexural strength at 23° C., and even maintained a flexural strength of around 70% or above at an even-higher temperature of 300° C. with respect to the flexural strength at 23° C. Further, each friction material was exposed to a temperature of 350° C. in an oven for 8 hours, removed from the oven, and then subjected to a flexural test at a measurement temperature of 23° C. The results were that the friction materials exhibited no decrease in strength.

Industrial Applicability

The present invention can provide a friction material and a resin composition for friction materials having good formability and in which the binder itself has excellent heat resistance and mechanical properties, compared to a friction material using a phenolic resin as a binder.

The invention claimed is:

1. A friction material comprising a resin composition, the resin composition comprising:
   5 to 30% by mass of an aromatic imide oligomer having an addition-reactive group at an end thereof;
   fiber; and
   inorganic filler; wherein,
   the addition-reactive group is a reactive group selected from the group consisting of a phenylethynyl group, an acetylene group, a nadic group, and a maleimide group,
   a tetracarboxylic acid component for producing the aromatic imide oligomer includes at least one tetracarboxylic acid dianhydride selected from the group consisting of: 2,3,3',4'-biphenyltetracarboxylic acid dianhydride, 2,2',3,3'-biphenyltetracarboxylic acid dianhydride, 3,3',4,4'-biphenyltetracarboxylic acid dianhydride, and 3,3',4,4'-benzophenone tetracarboxylic acid dianhydride,
   a diamine component for producing the aromatic imide oligomer includes at least two aromatic diamines selected from the group consisting of: 1,3-diaminobenzene, 1,3-bis(4-aminophenoxy)benzene, 3,4'-diaminodiphenyl ether, 4,4'-diaminodiphenyl ether, and 2,2'-bis(trifluoromethyl)benzidine, and wherein,
   the repeating number average of repeating units of the aromatic imide oligomer is from 0.5 to 20, and
   the aromatic imide oligomer has a melt viscosity at 280° C. of 1 to 15 poise.

2. The friction material according to claim 1, wherein the aromatic imide oligomer is represented by chemical formula (1):

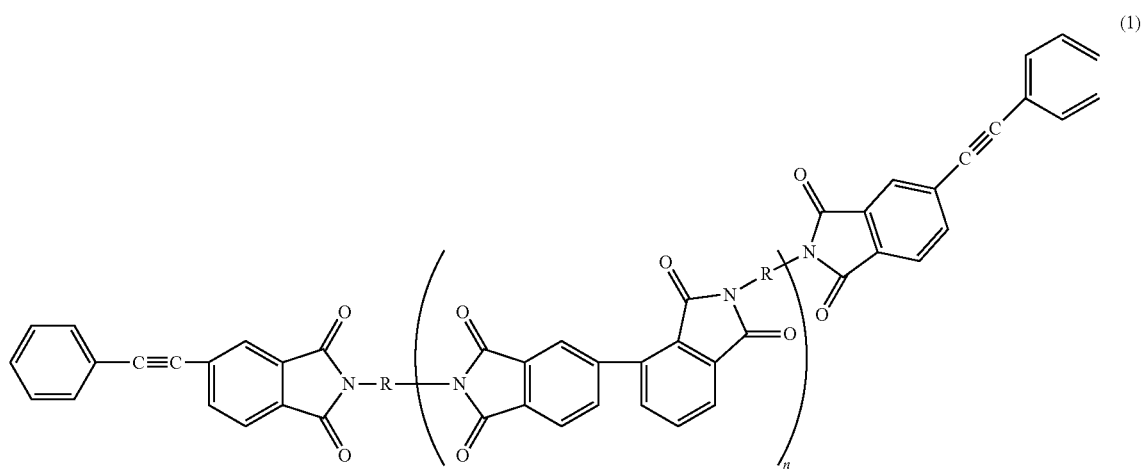

(1)

wherein R represents an aromatic diamine residue, and n is an integer of 0 to 20.

3. The friction material according to claim 1, wherein the fiber is at least one type of fiber selected from the group consisting of carbon fiber, aramid fiber, glass fiber, ceramic fiber and metal fiber.

4. The friction material according to claim 1, wherein the inorganic filler is at least one of calcium carbonate, barium sulfate, calcium hydroxide, aluminum powder, copper powder, graphite, molybdenum disulfide, cashew dust, rubber dust, mica and vermiculite.

5. The friction material according to claim 1, comprising 3 to 50% by mass of the fiber.

6. The friction material according to claim 1, comprising 5 to 40% by mass of the fiber.

7. The friction material according to claim 1, comprising 5 to 90% by mass of the inorganic filler.

8. The friction material according to claim 1, comprising 30 to 80% by mass of the inorganic filler.

9. The friction material according to claim 1, comprising 75 to 90% by mass of the inorganic filler.

10. The friction material according to claim 1, comprising 3 to 10% by mass of the fiber.

11. The friction material according to claim 1, comprising 5 to 20% by mass of the aromatic imide oligomers.

12. The friction material according to claim 2, wherein n is an integer of 0 to 10.

13. The friction material according to claim 1, wherein the repeating number average of repeating units of the aromatic imide oligomer is from 0.5 to 5.

14. The friction material according to claim 1, comprising,
5 to 30% by mass of the aromatic imide oligomer;
3 to 10% by mass of the fiber; and
75 to 90% by mass of the inorganic filler.

15. The friction material according to claim 1, wherein the diamine component comprises 1,3-diaminobenzene and 1,3-bis(4-aminophenoxy)benzene.

16. The friction material according to claim 15, wherein the tetracarboxylic acid component comprises 2,3,3',4'-biphenyltetracarboxylic acid dianhydride.

17. The friction material according to claim 1, wherein the addition-reactive group is an acetylene group.

18. The friction material according to claim 1, wherein the inorganic filler comprises calcium carbonate and barium sulfate.

* * * * *